United States Patent [19]

Whitehouse

[11] Patent Number: 4,672,092

[45] Date of Patent: Jun. 9, 1987

[54] EPOXIDE RESIN COMPOSITIONS

[75] Inventor: Robert S. Whitehouse, Stafford, England

[73] Assignee: Scott Bader Company Limited, Wellingborough, England

[21] Appl. No.: 678,542

[22] PCT Filed: Mar. 30, 1984

[86] PCT No.: PCT/GB84/00111

§ 371 Date: Nov. 20, 1984

§ 102(e) Date: Nov. 20, 1984

[87] PCT Pub. No.: WO84/03890

PCT Pub. Date: Oct. 11, 1984

[30] Foreign Application Priority Data

Mar. 30, 1983 [GB] United Kingdom ............... 8308722

[51] Int. Cl.$^4$ ............................................. C08L 63/10
[52] U.S. Cl. ..................................... 525/108; 525/119; 525/121
[58] Field of Search ................................ 525/108, 119

[56] References Cited

U.S. PATENT DOCUMENTS

| | | |
|---|---|---|
| 3,251,817 | 5/1966 | Hahn et al. ........................... 525/119 |
| 3,297,221 | 1/1967 | Grosner et al. . |
| 3,316,195 | 4/1967 | Grosner et al. . |
| 3,806,483 | 4/1974 | Juba et al. . |
| 3,947,523 | 3/1976 | Schuffling ............................ 525/119 |
| 3,963,797 | 6/1976 | Behrens ................................ 525/119 |
| 4,128,519 | 12/1978 | Bartoszek et al. . |
| 4,303,565 | 12/1981 | Tobias ................................ 525/119 |

FOREIGN PATENT DOCUMENTS

| | | |
|---|---|---|
| 2023473 | 11/1970 | Fed. Rep. of Germany . |
| 2815497 | 10/1979 | Fed. Rep. of Germany . |
| 1178732 | 1/1970 | United Kingdom . |
| 1407851 | 9/1975 | United Kingdom . |

OTHER PUBLICATIONS

Trostyanskaya et al., "The Effect of Rubber Latex Particles on the Mechanical Properties of Highly Crosslinked Epoxy Polymer" in *Polymer Science U.S.S.R.*, vol. 21, pp. 1456–1462.

Primary Examiner—Joseph L. Schofer
Assistant Examiner—Bernard Lipman
Attorney, Agent, or Firm—Watson, Cole, Grindle & Watson

[57] ABSTRACT

Curable epoxide resin compositions having improved mechanical and fire-resistant properties comprise an epoxide resin adducted with an elastomer polymer including a chlorinated monomer such as a chlorinated butadiene, vinyl chloride or vinylidene chloride and an unsaturated carboxylic acid monomer such as acrylic acid or methacrylic acid. The composition may be produced by stirring an aqueous latex of the polymer into the liquid resin, with heating if necessary. The compositions can be cured with conventional curing agents and can replace ordinary epoxide resins in most applications without any change in procedure.

10 Claims, No Drawings

EPOXIDE RESIN COMPOSITIONS

TECHNICAL FIELD

Epoxide resins are widely used as structural adhesives. They produce strong bonds with a wide variety of substrates. However, they are hard materials with low elongation and poor resistance to impact and flexural forces. These mechanical properties, and their high flammability, make them unsuitable for use for certain purposes for which they are otherwise well-suited.

BACKGROUND ART

Various attempts have been made to produce epoxide resin compositions with improved mechanical properties. Examples are described in U.S. Pat. Nos. 3,297,622, 3,316,195, 3,806,483 and 4,128,519. A paper by Trostyanskaya, Babayevskii and Kulik in "Polymer Science U.S.S.R." Vol. 21 pp 1456–1462 describes how epoxidised rubber latices can be incorporated into an epoxide resin using the compatibility provided by the epoxide functional groups and then co-reacting with these functional groups to produce a bonded matrix. Other attempts to improve the mechanical properties of epoxide resins have involved the incorporation of liquid nitrile rubber or the use of particular curing agents. However, the resulting compositions usually have inferior ultimate strength and a lower heat distortion temperature than unmodified resins.

The flammability of epoxide resins has been reduced by incorporating a halogen into the backbone of the resin structure, for example by the use of brominated bisphenol-A in the reaction mixture for producing the resins. Alternatively, conventional fire-retardants such as halogenated compounds, aluminum trihydrate, antimony compounds or phosphorus compounds may be incorporated in the resins. These additives, however, may have undesirable effects on other properties, for example lowering the heat distortion temperature.

DISCLOSURE OF THE INVENTION

According to this invention, a curable epoxide resin composition comprises an epoxide resin adducted with an elastomeric polymer including at least one chlorinated monomer and at least one unsaturated carboxylic acid monomer.

The epoxide resin composition may include more than one epoxide resin and/or more than one elastomeric polymer.

Chlorinated monomers suitable for use in performing the invention are chlorinated butadienes, vinyl chloride and vinylidene chloride. Preferred unsaturated carboxylic acids are acrylic acid and methacrylic acid. The carboxylic acid concentration in the polymer should be between 0.5 and 10 percent and typically is between 1 and 5 percent.

Suitable elastomeric polymers may include more than one chlorinated monomer and/or more than one unsaturated carboxylic acid monomer.

Suitable epoxide resins include bisphenol-A and bisphenol-F types, epoxy-novalak resins and brominated and alicyclic epoxides. The compositions may include more than one such resin.

The invention includes a method of manufacture of such an epoxide resin composition comprising the steps of stirring an aqueous latex of the elastomeric polymer or polymers into the epoxide resin or blend of epoxide resins in liquid state and removing the water.

On removal of the water, adducting reaction takes place between the carboxylic acid groups on the polymer or polymers and epoxide linkages on the epoxide resin or resins, producing the curable epoxide resin composition. The resin or resins must be present in sufficient quantity to ensure that the whole of the polymer or polymers is/are adducts, and is/are preferably present in excess. The product of the adducting reaction is soluble in the resin or resins, so in this case a stable homogeneous solution of the composition in the uncombined excess resin is produced.

MODES OF CARRYING OUT THE INVENTION

If the epoxide resin or blend of resins is sufficiently mobile at temperatures below 100° C., the first step, of stirring the polymer latex into the liquid resin or resin blend at room temperature, will produce a substantially uniform dispersion of polymer latex particles in the liquid resin matrix. Then, in the second step, the mixture is heated above 100° C. to drive off the water. This method may be modified for less mobile resins by first heating the resin or resin blend to a sufficiently mobile state in a pressure vessel and increasing the pressure to raise the boiling point of water above the temperature of the resin before adding the polymer latex and stirring to produce a dispersion as before. After mixing, the temperature may be raised above the boiling point or the pressure be reduced to lower the boiling point below the temperature of the mixture in order to remove the water by boiling.

In carrying out this method, mixing may be facilitated by pre-heating the polymer latex to a temperature below the relevant boiling point of water before adding it to the resin.

This method may not be satisfactory where high proportions, approaching 50 percent, of the elastomeric polymer or polymers is/are required in the finished composition. Coagulation of the polymer or polymer blend may occur as the water is being removed, and this will prevent completion of the adducting reaction.

In an alternative method, both steps of the invention are preformed simultaneously. The resin or resin blend is heated to a temperature above 100° C. and is agitated rapidly whilst the polymer latex is slowly added. The water is immediately volatilised and flashed off and the polymer or polymers is/are intimately mixed with the liquid resin whereupon the adducting reaction takes place. Again, the polymer latex may be pre-heated, and the pressure may be regulated to enable the method to be performed at a lower or higher temperature if this is necessary to provide adequate mobility in the resin or resin blend or to avoid coagulation or thermal decomposition of the polymer or polymer blend before the adducting reaction is completed.

The curable epoxide resin composition produced by the adducting reaction may be cured, like the original epoxide resin or resins, by use of conventional curing agents such as amines, polyamides, anhydrides or boron trifluoride adducts. On curing, the polymer separates out of the composition, forming discrete spheres in a matrix of cured resin. These improve the mechanical properties of the cured mass, in particular resisting crack development.

By particular selection of the elastomeric polymer or polymers used, the viscosity of the curable composition produced may be increased substantially compared with the original resin. Delayed action curing agents may be incorporated in the resin in the production of such viscous compositions, which are then useful as heat curable hot melt systems.

The presence of a chlorinated monomer in a polymer increases its compatibility with epoxide resins. In the method of the invention the presence of a chlorinated monomer assists in the establishment of a uniform dispersion of the polymer latex particles in the resin and promotes the adducting reaction. The chlorinated monomer furthermore reduces the flammability of the curable epoxide resin compositions produced by the reaction and reduces their water absorption as compared with the original epoxide resins used. Reduction of water absorption improves the strength of the cured compositions under conditions of high humidity.

Four examples of curable epoxide resin compositions were produced using a conventional bisphenol-A type epoxide resin produced by Dow Chemical Company under their reference DER 330 and four different polymer latices. This resin is liquid at normal room temperatures and the compositions were produced by the first method described above, that is by stirring each polymer latex into a quantity of the resin to produce a uniform dispersion and then heating to remove the water and allowing the resultant composition to cool. The polymer latices added, expressed as parts by weight of dry polymer per hundred parts of resin (phr) were as follows:

1. Haloflex 202 (Imperial Chemical Industries P.L.C.)—an emulsion of a terpolymer including vinylidene chloride, vinyl chloride, an alkyl acrylate or alkyl methacrylate and an unsaturted carboxylic acid mnomers—20 parts.

2. Polidene 33075 (Scott Bader P.L.C.)—an emulsion of a polymer including vinylidene chloride and acrylate monomers—20 parts.

3. Baypren 4R (Bayer AG)—anionic carboxylated polychloroprene and methacrylic acid latex—10 parts.

4. Neoprene Latex 115 (Du Pont)—non-ionic carboxylated polychloroprene and methacrylic acid latex—30 parts.

Standard 25 mm×25 mm overlap test joints were made with the resin DER 330 and each of the compositions produced as above, in each case blending in 5 phr of Ancaflex 1171 (Anchor Chemical Company) a boron trifluoride adduct curing agent, and the joints were conventionally cured for 2 hours at 50° C. followed by 2 hours at 100° C. Shear strength tests on the cured joints produced the following results:

The cured joints were loaded in shear and the loads (Newtons) at failure were:

Resin DER 330: 3550
Composition 1: 6550
Composition 2: 9730
Composition 3: 7730
Composition 4: 6940

Haloflex, Polidene, Baypren, Neoprene and Ancaflex are Registered Trade Marks.

INDUSTRIAL APPLICABILITY

Curable epoxide resin compositions according to the invention may be used in place of ordinary epoxide resins in most of their usual industrial applications, generally without any change in procedure, with beneficial results. In mechanical structures including elements such as joints or structural components produced by curing a curable epoxide resin composition according to the invention, improvements are likely to be found in specific adhesion, tensile strength, impact resistance and resistance to crack development as well as in reduced flammability of the elements.

I claim:

1. A curable resin comprising an epoxide resin having epoxide groups chemically combined with an elastomeric polymer, the elastomeric polymer including residues derived at least from a chlorinated monomer selected from the group consisting of chlorinated butadienes, vinyl chloride and vinylidene chloride and from an unsaturated carboxylic acid monomer selected from acrylic and methacrylic acids, which unsaturated carboxylic acid monomer provides carboxylic acid groups on the elastomeric polymer, essentially all of the elastomeric polymer being chemically combined with the epoxide resin, the chemical combination resulting from an addition reaction between the carboxylic acid groups of the elastomeric polymer and the epoxide groups of the epoxide resin, said curable resin being capable of dissolving in epoxide resin which is not chemically combined with the elastomeric polymer.

2. A curable resin as claimed in claim 1, including more than one epoxide resin having epoxide groups chemically combined with the elastomeric polymer.

3. A curable resin as claimed in claim 1, wherein the epoxide resin has epoxide groups chemically combined with more than one elastomeric polymer, each elastomeric polymer including at least one chlorinated monomer and at least one unsaturated carboxylic acid monomer.

4. A curable resin as claimed in claim 1, the elastomeric polymer of which is derived from a latex of the elastomeric polymer in an aqueous medium.

5. A curable resin as claimed in claim 4, wherein the elastomeric polymer is an emulsion polymer.

6. A curable resin composition comprising a homogeneous solution of a curable resin in an epoxide resin, said curable resin comprising an epoxide resin having epoxide groups chemically combined with an elastomeric polymer, the elastomeric polymer including residues derived at least from a chlorinated monomer selected from the group consisting of chlorinated butadienes, vinyl chloride and vinylidene chloride and from an unreacted carboxylic acid monomer selected from acrylic and methacrylic acids, which unsaturated carboxylic acid monomer provides carboxylic acid groups on the elastomeric polymer, essentially all of the elastomeric polymer being chemically combined with the epoxide resin, the chemical combination resulting from an addition reaction between the carboxylic acid groups of the elastomeric polymer and the epoxide groups of the epoxide resin, said curable resin being dissolved in epoxide resin which is not chemically combined with the elastomeric polymer.

7. A curable resin according to claim 1, wherein said curable resin is capable of dissolving in excess of said exposide resin of said combination.

8. A curable resin according to claim 6, wherein the epoxide resin which is not chemically combined with the elastomeric polymer is an excess of said epoxide resin of said combination.

9. A curable resin according to claim 1, wherein said epoxide resin is selected from the group consisting of bisphenol A-type epoxy resin, biphenol F-type epoxy resin, epoxy-novalak resins, brominated epoxides and alicyclic epoxides.

10. A curable resin according to claim 6, wherein said epoxide resin is selected from the group consisting of bisphenol A-type epoxy resin, bisphenol F-type epoxy resin, epoxy-novalak resins, brominated epoxides and alicyclic epoxides.

* * * * *